UNITED STATES PATENT OFFICE.

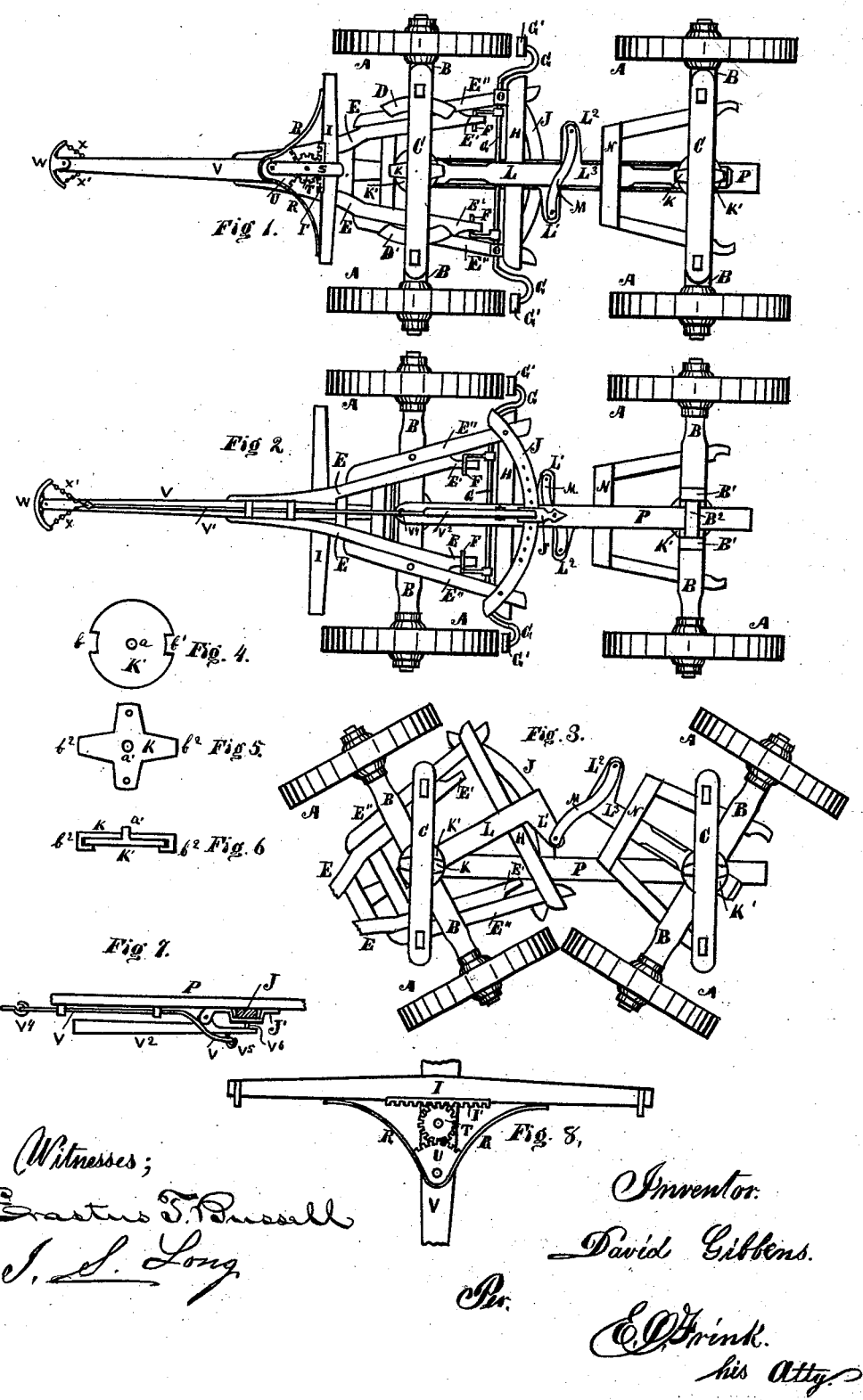

DAVID GIBBENS, OF BELLEVILLE, INDIANA, ASSIGNOR OF ONE-HALF HIS RIGHT TO WILLIAM C. SWINDLER, OF SAME PLACE.

IMPROVEMENT IN RUNNING-GEARS.

Specification forming part of Letters Patent No. 173,116, dated February 8, 1876; application filed November 24, 1875.

*To all whom it may concern:*

Be it known that I, DAVID GIBBENS, of Belleville, county of Hendricks, State of Indiana, have invented certain Improvements in Running-Gears of Vehicles, of which the following is a description, reference being had to the accompanying drawings.

My invention consists in the construction and arrangement of devices applied to vehicles, substantially as set forth in the annexed claims.

Figure 1 represents a plan view of the top of a vehicle embodying my invention. Fig. 2 is a plan view of the bottom of the same. Fig. 3 is a plan view of the top of the vehicle, showing the wheels out of line, as in turning a curve. Fig. 4 represents the bottom bolster-plate. Fig. 5 represents the upper bolster-plate. Fig. 6 represents a sectional side view of the two bolsters together. Fig. 7 represents a section of the weighted lever and its connections with the coupling-pole and hounds. Fig. 8 represents the double-tree and its connections with the tongue.

B B represent the axles, mounted on the wheels A A in the usual manner. P represents the main coupling-pole, and is secured to the front axle by a pivot-bolt, and to the rear axle between the strap $B^2$ and axle. The strap $B^2$ is also secured to the axle by bands $B^1 B^1$. Immediately over the coupling P is arranged the jointed coupling-pole L $L^3$. The half marked L is securely fastened into the front axle at one end, and the other end, $L^1$, is formed L shape. The other half of the coupling, $L^3$, is also secured at one end to the rear axle by passing through a mortise, and is provided with a number of pin-holes for the purpose of lengthening the wagon. The other end of the coupling $L^3$ is formed with an L-shaped portion, $L^2$, in the reverse direction to $L^1$ of the opposite half. These two L-shaped projections $L^1 L^2$ are united together above and below by the S-shaped bands M, in such a manner as to allow the jointed coupling-pole L to assume the position as shown in Fig. 3, when the vehicle is being turned in either direction. The rear half of the jointed coupling-pole $L^3$ is also supported by the hounds N, which are also secured to the rear axle, as shown. On the front axle, at equal distance from the bolster, are arranged two segments, D D', on which the wooden bolster C rests. The hounds E'' E'' are also secured to the front axle on the bottom side, and are united at their rear ends by the bar H above the hounds, and by the segmental rack J below. Between the stationary hounds E'' E'' are pivoted the tongue-hounds E, with the tongue V attached in the usual manner. The rear ends of tongue-hounds E E at E' E' are made to operate against the crank-arms F F when the tongue is elevated in front, as in going down hill, causing the arms F to be forced down, which communicates motion to the brake-rod G, to which the arms F F are attached, and forces the brakes G' G' against the front wheels, thus retarding the motion of the vehicle, and at the same time does not prevent the front wheels from taking any curve required. The double-tree I is provided with a cog-rack, I', on the front side at the center, which engages with a small pinion, T, pivoted to the tongue V in front. The pinion T also meshes in gear with a segmental rack, U, which is also pivoted to the tongue in front of the pinion T, and all held in position by the strap S. The segmental rack U is also provided with a spring, R, on each side, which rests against the front side of the double tree I in such a manner as to hold the double-tree at right angles to the tongue. This arrangement of the double-tree and gearing allows the position of the rack I to vary and equalize the draft of the horses, and will always give the weakest horse the longest end of the double-tree, whereby he gains leverage against the strongest horse.

At the end of the tongue V is arranged a vibrating crab, W, which is pivoted to the tongue. The ends of the crab are secured to the hames in the usual manner. The chains $x x'$ are also attached to the ends of the crab, and extend back, and are attached to the end of the rod $V^1$, which is jointed near the pivot-joint of the hounds, and supported in proper guides arranged under the tongue in such a manner as to operate on the hook $V^5$ of the weighted lever $V^2$, that is pivoted to the under side of the coupling-pole P, or to a projecting hinge formed on the strap J', that slides on the segmental rack J, as shown in Fig. 2 and more fully in Fig. 7, and pull the pin $V^6$ out of the segmental rack J when either of the horses moves ahead of the other, as in turning a curve this arrangement releases the pin $V^6$ from the rack J, and allows the front axle to turn on its bolster; but when the horses are pulling straight ahead then the crab W stands at right angles to the pole, and the weighted end of the lever $V^2$ hangs down, thus placing the pin $V^6$ on the end of the lever $V^2$ in the center hole of the rack J, and prevents the front axle from turning on its bolster.

The bolster is constructed of a lower disk-plate, K′, which is securely fastened to the axle, and is provided with a stud, $a$, and two notches, $b$ $b^1$, opposite each other. Into these two notches the gibbed ends of the top plate K are inserted, the stud $a$ passing through the hole $a'$ of the plate K. By turning the plate K after the gibs $b^2$ $b^2$ have been inserted in the notches $b$ $b^1$ the top and bottom plates are locked together, although free to revolve on each other. This arrangement does away with the ordinary king-bolt.

What I claim as new, and wish to secure by Letters Patent, is—

1. The double-tree I, provided with the rack I′, in combination with the pinion T, segmental pinion U, springs R R, strap S, and tongue V, substantially as set forth and described.

2. The vibrating crab W, in combination with the chains $x$ $x'$ and jointed rod $V^1$, constructed to operate the weighted lever $V^2$, to withdraw the pin $V^6$ from pin-rack J, substantially as and for the purpose specified.

3. The weighted lever $V^2$, pivoted to the coupling-pole P or strap J′, and provided with a pin, $V^6$, and hook $V^5$, constructed to operate substantially as specified.

4. The hinged strap J′, in combination with the weighted lever $V^2$, substantially as specified.

5. The segmental pin-rack J, in combination with the hounds E″ E″ and weighted lever $V^2$, and hinged strap J′, substantially as set forth and described.

6. The automatic brake-rod G, provided with the crank-arms F F, in combination with the hounds E″ E″ and ends E′ E′ of the tongue-hounds E, whereby the brake is operated by the elevation of the forward end of the tongue, substantially as set forth and described.

7. The jointed coupling-pole L $L^3$, provided with L-shaped projections $L^1$ $L^2$, and secured to the front and rear axles B B, substantially as set forth and described.

8. The S-shaped or straight straps M, in combination with the projections $L^1$ $L^2$ of the jointed coupling L $L^3$, substantially as set forth and described.

In testimony whereof I have signed my name to this specification in the presence of two subscribing witnesses.

DAVID GIBBENS.

Witnesses:
JOHN F. COPPOCK,
WM. C. SWINDLER.